United States Patent

[11] 3,610,307

| [72] | Inventors | Karl Huff<br>Ahlem/Hannover;<br>Heinz Moeller, Apelern/Wunstorf; Rolf<br>Krauss, Langenhagen/Hannover, all of<br>Germany |
|---|---|---|
| [21] | Appl. No. | 872,952 |
| [22] | Filed | Oct. 31, 1969 |
| [23] | | Division of Ser. No. 678,382, Oct. 26, 1967,<br>Pat. No. 3,523,848 |
| [45] | Patented | Oct. 5, 1971 |
| [73] | Assignee | Continental Gummi-Werke<br>Aktiengesellschaft<br>Hannover, Germany |
| [32] | Priority | May 27, 1967 |
| [33] | | Germany |
| [31] | | P 17 29 586.2 |

| [52] | U.S. Cl. | 150/2.1 |
|---|---|---|
| [51] | Int. Cl. | A61f 7/04 |
| [50] | Field of Search | 150/2.1-2.7 |

[56] References Cited

UNITED STATES PATENTS

| 1,607,963 | 11/1926 | Patterson | 150/2.1 |
| 1,897,025 | 2/1933 | Palmer | 150/2.1 |
| 2,153,441 | 4/1939 | Tillotson | 150/2.1 |
| 2,563,933 | 8/1951 | Hipps | 150/2.1 X |

*Primary Examiner*—Donald F. Norton
*Attorney*—Walter Becker

[54] HOLLOW BODIES OF RUBBER AND RUBBERLIKE VULCANIZABLE SYNTHETIC MATERIALS
1 Claim, 3 Drawing Figs.

ABSTRACT: An improved hollow body of rubber material, especially warm water bottle, which is characterized in that its surface is of a textile material, as for instance, terry cloth.

INVENTORS
Heinz MOELLER
Karl HUFF
Rolf KRAUS
BY
Walter Becker

HOLLOW BODIES OF RUBBER AND RUBBERLIKE VULCANIZABLE SYNTHETIC MATERIALS

The present invention relates to warm water bottles and similar flat hollow bodies of rubber or rubberlike vulcanizable synthetic materials and is a divisional application of our copending application Serial No. 678,382, filed Oct. 26, 1967, now U.S. Pat. No. 3,523,848-Huff et al. issued Aug. 11, 1970 and belonging to the assignee of the present invention.

It is an object of the present invention to provide an improved improved product of the above-mentioned type.

More specifically, according to the present invention, cuts in conformity with the article to be made, which consist if textile material, are together with unvulcanized plates of rubber material inserted into the vulcanizing mold and after the mold has been closed, the said cuts of textile material are under the effect of inner pressure pressed into the outer surface of unvulcanized plates and in the course of the vulcanization are firmly connected thereto. Preferably, cuts of textile material having nearly the shape of the unvulcanized rubber plates are inserted into the vulcanizing mold and within the range of adjacent edges of said plate are brought into contact with each other.

The cuts of textile material may successively be inserted into the mold before or simultaneously with the unvulcanized plates. In the last-mentioned instance, the cuts of textile material may already prior to the insertion be brought into loose connection with the unvulcanized plates. Thus, for instance, it is possible to cut both components in superimposed arrangement to the intended approximate dimensions and to loosely connect said components under the effect of the cutting pressure at the respective cutting edges.

As starting material for the envelope there may, depending on the particular circumstances, be employed a woven fabric, a knitted fabric, or a felt or a fleece with fibers which are intermixed at random position or arrested fibers. For warm water bottles, the envelope may advantageously consist of a terry cloth material or any other curly material.

The invention is illustrated by way of example in the accompanying drawing, in which.

Figure 1:
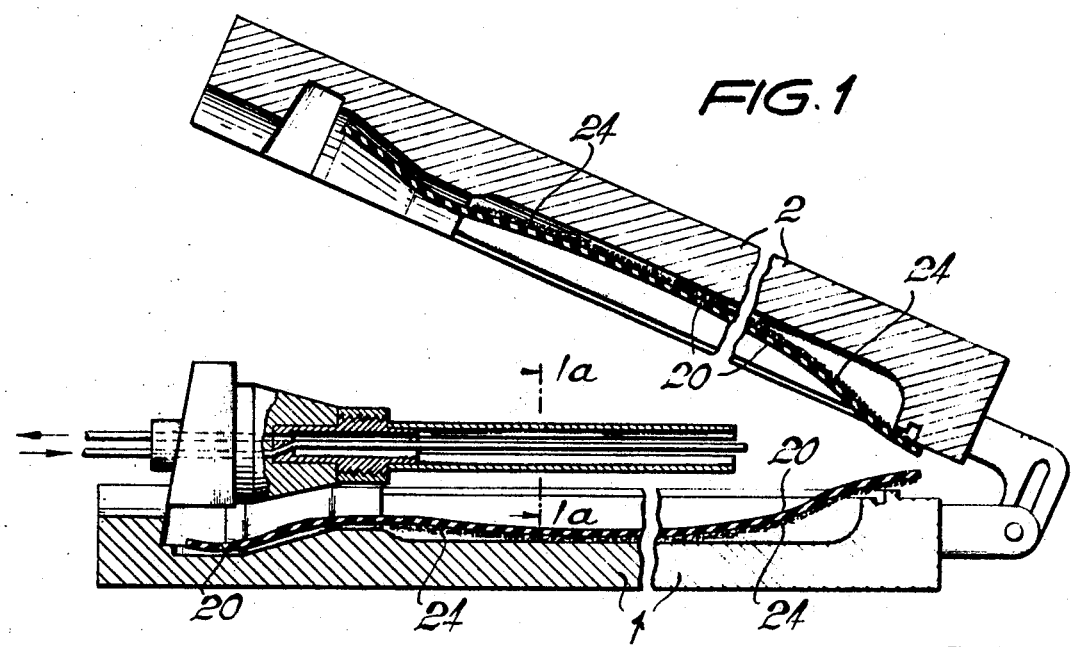
FIG. 1 is a section through an opened vulcanizing mold showing the layers forming the warm water bottle to be formed.
Figure 1A:
FIG. 1a is a section taken along line 1a of FIG. 1.

Referring to the drawing in detail, the vulcanizing mold shown therein comprises two mold plates linked to each other, namely the bottom plate 1 and the top plate 2 which in closed condition of the mold define the hollow mold chamber therebetween. In the thus formed hollow mold chamber there may be introduced from the outside a pipe for producing inside the mold the inner pressure required for the molding and vulcanizing operation, and also for introducing hot steam.

Figure 2:
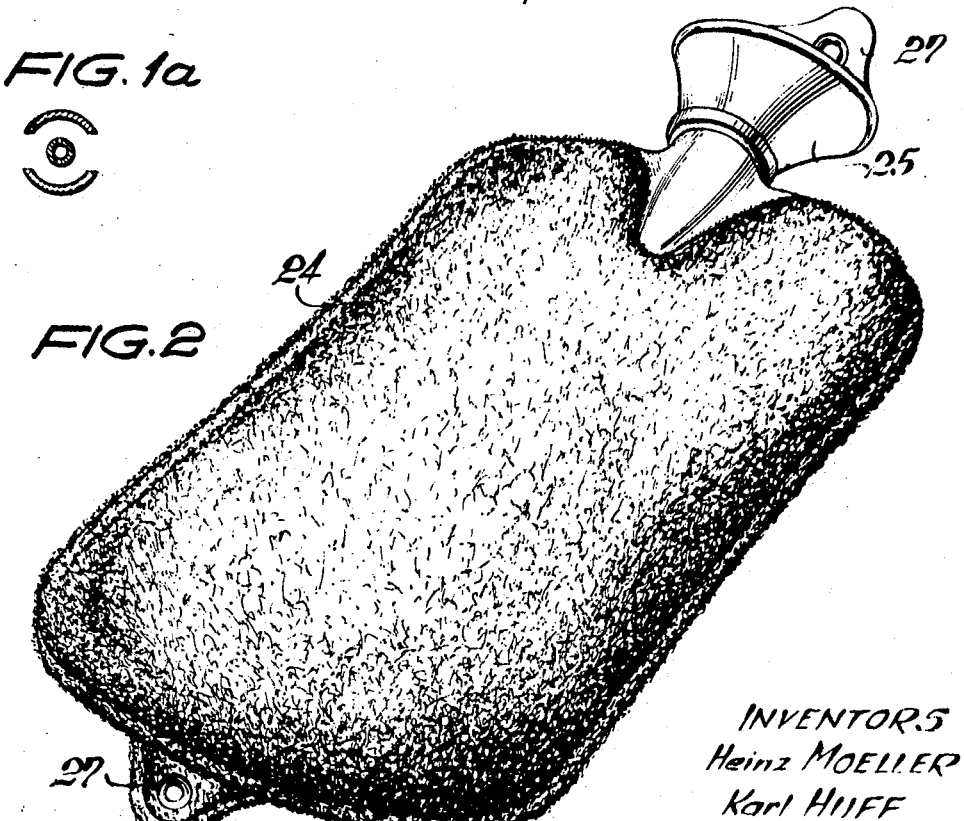
FIG. 2 is a perspective view of a warm water bottle made in conformity with the present invention.

According to the present invention, prior to inserting the unvulcanized plates 20, cuts of fabric 24 are inserted into the partial chambers of the mold plates 1, 2. The said cuts 24 may consist of a curled fabric, as for instance of the type of terry cloth, and are as to shape roughly similar to the unvulcanized plates 20. In order to be able within the area of the bottle neck 25 to obtain an appealing upper end of the cover, said end, may be designed as indicated in FIG. 2. Fundamentally, however, there are no objections against covering also said bottle neck 25 or the suspension ears 27 or the like with the cover material. The plates 1, 2 need not individually be lined with the various components, but, if desired, the layers can be superimposed solely in the bottom plate 1. In this connection, the sequence is of importance: cut 24 of the fabric—lower unvulcanized plate 20—introducing the valve pipe—upper unvulcanized plate 20—cut 24 of the fabric.

The thus prepared mold is then closed by closing the plates 1 and 2 and is inserted into a vulcanizing press to initiate the vulcanizing process. When the warm water bottle is finish vulcanized and withdrawn from the mold, it is merely necessary to remove the overflow, and the cuts 24 will appear as a coherent single envelope permeated by rubber and firmly connected thereto.

As will be evident from the above, the present invention leads in a rather simple manner to finished products with a textile outer envelope which greatly enhances the value of use of such articles. In addition to warm water bottles, also other articles may, of course, be produced according to the invention, as for instance ice bags, pillows, and airtight and watertight containers. Since articles of this type in most instances contact the human body, the envelope around the article makes the contact of the human body with the article more agreeable, aside from the fact that also the handling of the article is greatly improved in as much as it will not slip in a wet hand as is frequently the case with articles having a plain rubber surface. Furthermore, the envelope has a heat insulating effect and thus prevents too fast a warming up or cooling off of the contents in the respective article. The invention also simplifies and reduces the cost of manufacture of the vulcanizing mold inasmuch as the heretofore frequently employed engraving of the mold to create a certain pattern will be superfluous.

Heretofore, covers the type referred to above could be applied only in a noncoherent manner with cements or the like. According to one heretofore known method it was suggested, for purposes of making warm water bottles, to immerse a fabric bag into a latex solution an after the vulcanization of the latex impregnation to tease said bag. In contrast thereto, the present invention eliminates the necessity of employing adhesive means and without additional steps assures a reliable connection of the textile envelope to the rubber walls over the surface of the respective article. With the exception of the insertion of the cuts of fabric into the vulcanizing mold, no changes in the customary method are required. The firm connection which is obtained by the partial embedding of the enveloping material in the unvulcanized plates under the influence of the inner pressure contributes, in addition to the realization of the above-mentioned advantages, to a desired stiffening of the finished article and permits the employment of thinner wall thicknesses and also the employment of mixtures which are more favorable from a price standpoint.

It is, of course, to be understood that the present invention is, by no means, limited to the particular embodiment shown in the drawing but also comprises any modifications within the scope of the appended claims.

It is also to be understood that the term "rubber material" as it appears in the claims also includes vulcanizable synthetic materials having rubberlike qualities.

What is claimed is:

1. A hot water bottle which comprises two sidewalls of rubber material vulcanized together to form a hollow body and having a cover of textile material having an inner surface vulcanized to said walls so that the rubber material partly permeates said textile material on the inner surface, said textile material having an outer fibrous surface of unwoven fibers to reduce slipping and improve the insulating effect, said body having an apertured solid tab on one end formed of the two thicknesses of the rubber walls vulcanized together covered on both sides with said textile material, so that said textile material forms a reenforcement for said tab.